Oct. 9, 1956
J. H. DEVINE
2,765,698
SECTIONAL THREADLESS FASTENER AND
CAMMING WASHER MEANS THEREFOR
Filed March 23, 1953
3 Sheets-Sheet 1
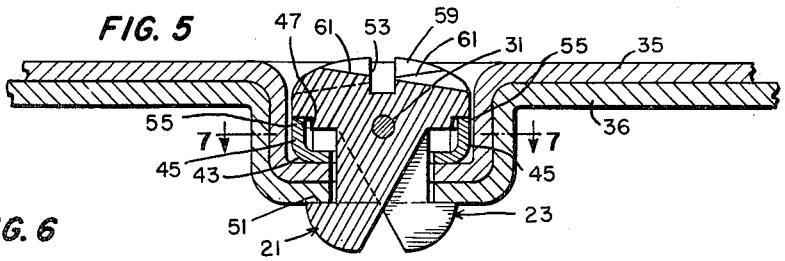
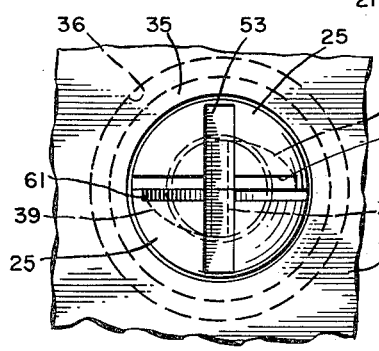
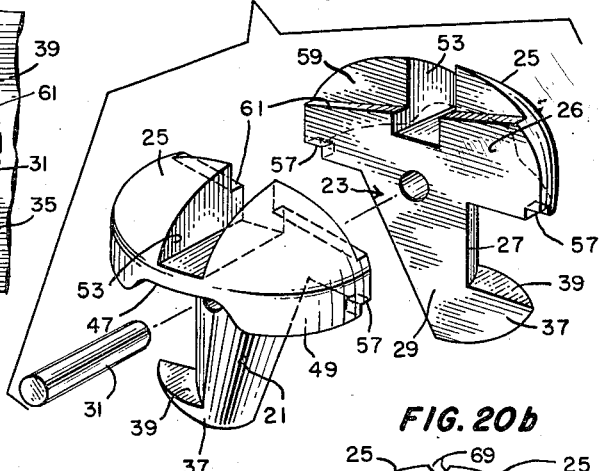
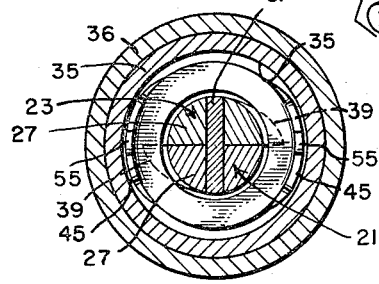
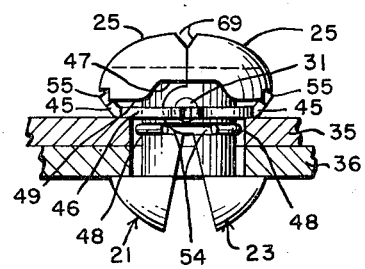
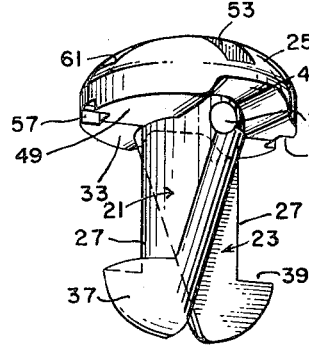
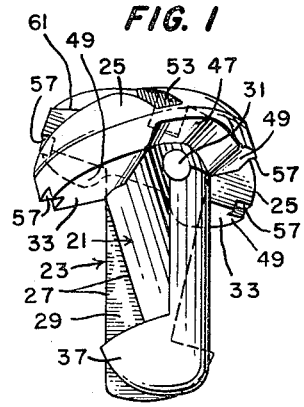
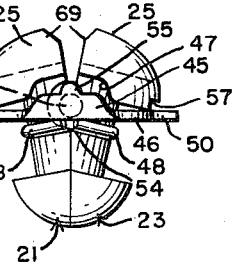
INVENTOR
JAMES H. DEVINE
BY Robert A. Lavender
ATTORNEY Oct. 9, 1956 J. H. DEVINE 2,765,698
SECTIONAL THREADLESS FASTENER AND
CAMMING WASHER MEANS THEREFOR
Filed March 23, 1953 3 Sheets-Sheet 2

INVENTOR
JAMES H. DEVINE
BY
Robert A. Lavender
ATTORNEY

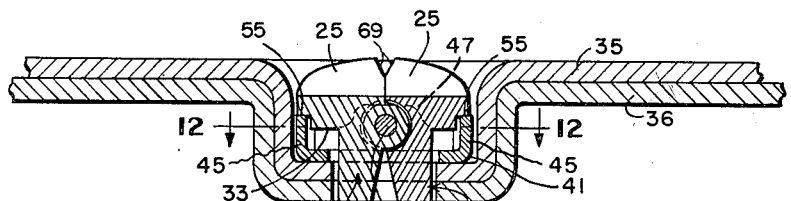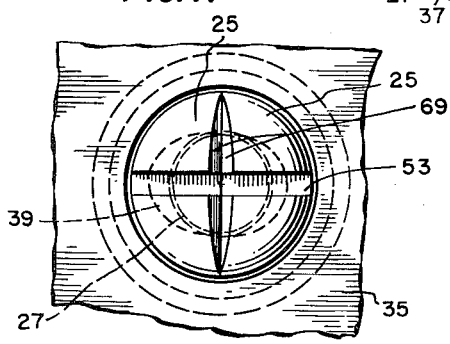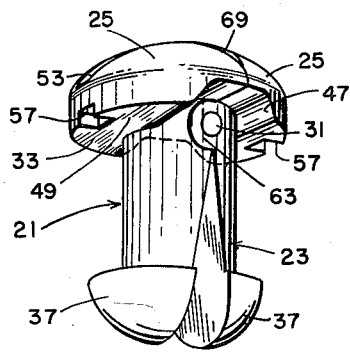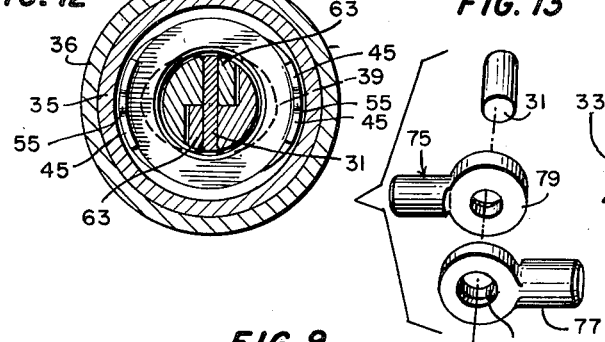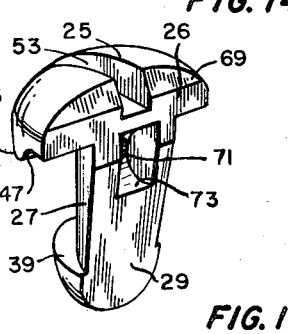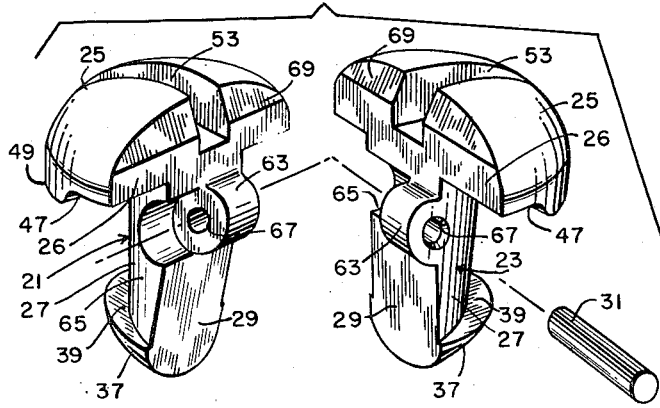
INVENTOR
JAMES H. DEVINE
ATTORNEY United States Patent Office 2,765,698
Patented Oct. 9, 1956

2,765,698

SECTIONAL THREADLESS FASTENER AND CAM-
MING WASHER MEANS THEREFOR

James H. Devine, Washington, D. C.

Application March 23, 1953, Serial No. 343,893

3 Claims. (Cl. 85—5)

This invention relates to fasteners and more particularly to quick engaging and disengaging fasteners and adapted to withstand large tension and shear forces to bind articles together under relative high compression forces.

A great many forms of fasteners are available in the prior art, most of which are fragile in construction and adapted to exert only relative light compression forces between the articles to be fastened together. See, for examples, the U. S. Patent to Fife, No. 1,360,386 in which tension is set up in V-shaped arms to hold together two layers of woven material and the U. S. Patent to Costello, No. 1,193,997 in which a spring keeps the fastener parts in operative positions only and which fastener is not adapted to exert any compression forces between or within the articles to be fastened together. Other fasteners require many or complicated parts for their operation. See U. S. Patent to Dzus, No. 2,614,-306 which requires a separate receptacle attaching member, such as a length of wire and a specially prepared slot therefor, and which requires springs having compression movements at least equal to the depth of the spiral slots in the stud member. See also U. S. Patent No. 1,062,921 to Kinsel, that requires grooved sockets and mortises. See also U. S. Patent No. 1,425,618 to Vodicka which requires two separate springs and the operation of the fastener depends upon the relative relative strength of these two springs.

The principal object of the present invention is to overcome the disadvantages found in the prior art and provide a fastener that is simple and rugged in its construction and consists of the fewest possible parts that are so arranged as to hold articles firmly together under relative high compression forces.

Another object of the invention is to provide a fastener that is quickly, easily and positively applied and detached and adapted for long continued use and repeated reuse.

Another object of the invention is to provide a fastener that is adapted to secure together articles that are relatively thick, requiring relatively extended or long shanks.

Another object of the invention is to provide a fastener that projects only slightly above the exposed surfaces of the articles to be fastened together.

Another object of the invention is to provide a fastener, including any necessary resilient part, that may be assembled in a complete unit ready for immediate use without further joining or adjustment of parts.

Other objects will be apparent from the following description of the invention, including the drawings made a part thereof, in which:

Figure 1 is a view in perspective of the "slide" form of fastener of the present invention, that is, the two complementary, cooperating parts are so pivoted on each other that the parts slide one on the other. The figure shows the fastener in its "collapsed" condition, that is, the flat surfaces of the shanks of the parts overlap each other preparatory to the fastener being inserted into holes in articles to be fastened together;

Figure 2 is a similar view of the fastener shown in Figure 1, but in its "expanded" condition, that is, the shanks of the parts are positioned relative to each other so as to engage surfaces of the articles to be fastened together;

Figure 3 is an exploded view in perspective of the fastener shown in Figure 2;

Figure 5 is a vertical cross section view of the fastener shown in Figure 2, countersunk in and holding two plates in compression;

Figure 6 is a plan view of the fastener and plates shown in Figure 5;

Figure 7 is a horizontal cross section view taken on line 7—7 of Figure 5;

Figure 8 is a view in perspective of the "spread" type of fastener of the present invention, in its expanded condition, that is, the flat surfaces of the shanks of the two component parts of the fastener have been spread away from each other and the flat surfaces of the heads are parallel to and in contact with each other;

Figure 9 is an exploded view in perspective of the fastener disclosed in Figure 8 showing one form of a pivot system for the two component parts of the fastener;

Figure 10 is a vertical cross section view of the fastener disclosed in Figure 8, countersunk in and engaging under tension two plates;

Figure 11 is a plan view of the fastener and plates shown in Figure 10;

Figure 12 is a horizontal cross section taken on line 12—12 of Figure 10;

Figure 13 is an exploded view in perspective of a modified pin pivot system for the spread type fastener of the present invention;

Figure 14a is a horizontal cross section view of a "spread" type fastener taken in the plane of the axis of the pin pivot system shown in Figure 13;

Figure 14b is a perspective view of one of the counterparts of the spread fastener disclosed in Figure 8, showing a modification of the journal therein, adapted to receive the pivot system disclosed in Figure 13;

Figure 15:
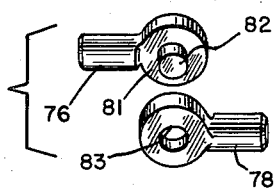
Figure 15 is an exploded view in perspective of a second or modified pivot system for the spread type fastener of the present invention.

Figure 20a is a view in perspective of a spread fastener in its collapsed condition, the counterparts and resilient member being held together as a unit by a C-ring, the resilient member having lugs thereon adapted to engage a spanner wrench; and Figure 20b is a side elevation view of fastener and resilient member of Figure 20a, shown in its expanded condition and under tension holding together two plates shown in cross section.

Similar reference characters are applied to similar parts throughout the several views.

Referring particularly to Figures 1, 2, 3, 4a, 5, 6 and 7, there is shown therein a slide fastener that consists of two cooperating and complementary counterparts 21 and 23, each consisting of a tension head 25 and a shank portion 27, the axis of which shank is a continuation of the vertical axis of the head 25.

Each of the parts 21 and 23 has a single and continuous flat surface 29 that slides on one another as the parts 21 and 23 pivot about a pin 31 journaled within the respective parts. This flat surface consists of the surface 26 of head 25 and surface 29 of shank 27. Surfaces 26 and 29 are in the same plane.

The cross sectional shape of the shank 27 as it joins the head 25 is semicircular and with a radius less than that of head 25, whereby an overhanging ledge 33 is formed. One longitudinal portion of the shank 27 extends at right angles to ledge 33. In this portion and at a distance from the ledge 33 equal substantially to the thickness of the articles to be fastened together (in the present disclosure plates 35 and 36) is positioned a toe 37 having a flat surface 39 parallel to the opposite ledge 33 and equal substantially to the width of ledge 33.

The other longitudinal portion of the shank 27 is tapered longitudinally from the inner edge of the ledge 33 to a position beyond the surface 39 of toe 37. This taper is at such an angle with the plane of ledge 33 that the greatest dimension of the toe and the shank in the plane of the surface 39 is substantially equal to the inner diameter of ledge 33 and the diameter of the holes in the plates 35 and 36.

It is apparent that in no transverse plane of the two shanks, in their collapsed condition, does the greatest dimension exceed the diameter of the shanks in the plane common to the shanks and the ledges. The fastener is, therefore, adapted to be used in securing articles together of any thicknesses, as long as the length of the shanks from the said common plane to the plane of the toe is substantially the combined thicknesses of the articles.

Figure 4B:
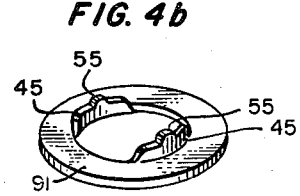
Figures 4a, 4b, 4c and 4d are views in perspective of four forms, respectively, of a resilient member that is positioned between the heads of the counterparts of the fastener and the exposed surface of one of the articles to be fastened together.
Figure 4C:
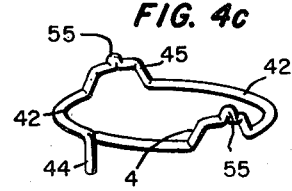
Figure 4A:
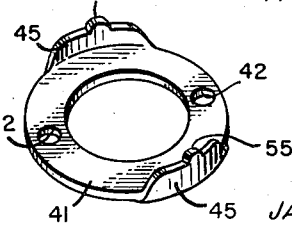

Secured to the exposed surface of the upper plate 35 is a resilient tension member 41, such as shown in Figure 4a as a generally flat washer with its peripheral edge bent up slightly, as at 43 (Figure 5). Resilient member 41 is secured or attached to plate 35 by spot welding, by screws passing through holes 42 or by any other suitable manner. At opposite ends of a diameter of member 41 are upturned sections, projections or cams 45 the upper or edge surfaces of which form varying cam surfaces that are adapted to contact ledges 33.

Portions of ledges 33 are cut away or "recessed" as at 47 to form, with the other-than-cut-away portions or "extended" portions 49 of ledges 33, varying cam surfaces to contact the cam surfaces on member 41. It will thus be apparent that when the ledges 33 are in contact with member 41 and the parts 21 and 23 are rotated about their vertical axes relative to member 41, the extended portions 49 of ledges 33 will ride up on or ride down from the upper edges of cams 45 and thus place the parts 21 and 23 in tension as a unit, as toes 37 engage the under or blind surface side of plate 36, as at 51 in Figure 5, or release said tension. The parts 21 and 23 may be turned about their vertical axes by the end of a flat plate, such as the tip end of a screw driver, engaging slot 53.

On the upper surfaces of cams 45 are protrusions 55 that fit into niches 57 in extended portions 49 of ledges 33, to prevent the parts 21 and 23 from rotating about their vertical axes under the influence of vibration. The niches 57 in ledges 33 are located 90 degrees in azimuth from the center line of cut away portions 47.

The heads 25 are also cut away as at 59 at such an angle that when the parts 21 and 23 are in their collapsed condition (Figure 1) the surfaces 61, the lower surfaces of the cut away portions 59, are parallel to each other. Thus the parts 21 and 23 are adapted to be moved to their collapsed condition from their expanded condition by pressing down on the lower surfaces 61 of the cutaway portions 59 by the end of a flat plate, such as the tip end of a screw driver. The fastener in its collapsed condition may then be removed from the holes in the plates 35 and 36 and be ready for reuse.

In operation: The fasteners are assembled by pivoting the two parts 21 and 23 on pin 31 with the flat surfaces 26 and 29 of one part in slide contact with the corresponding surfaces of the other part. The ends of pin 31 may then be peened over to assure that parts 21 and 23 remain in contact as a unit.

Holes are made in plates 35 and 36 and the resilient member 41 is secured to the upper surface (exposed surface) of the upper plate.

A fastener is selected such that the length of its shank is substantially the thickness of the articles to be fastened together plus the height of sections 45 on member 41, the radius of the shank at the plane of the ledge 33 being substantially the radius of the holes in the plates 35 and 36 and the radius of the ledge 33 being substantially the outer radius of the member 41. The selected fastener is then placed in its collapsed condition (Figure 1) and is inserted through the hole in member 41 and through the holes in plates 35 and 36, with the recessed portions 47 of ledges 33 directly over and in line with cams 45.

When extended portions 49 of ledges 33 strike the flat surface on member 41 and a downward force is exerted on heads 25, portions 49 act as pivot points and the parts 21 and 23 pivot on member 41 about these contact pivot points and pivot on each other on the pivot pin 31, forcing the toes 37 outward so that the flat surfaces 39 are in "engaging" positions relative to the under or blind surface of plate 36, as at 51. When the parts 21 and 23 are in their engaging positions and conditions, the toes 37 are so positioned that their flat surfaces 39 are opposite the under or blind surface of the lower plate 36.

Parts 21 and 23 are then rotated as a unit about their common vertical axis by a suitable tool engaging slot 53. Portions 49 of ledges 33 are thereby caused to ride up on cams 45 against the resilience of the member 41. The parts 21 and 23 are then under tension and in a "tightened" condition and the plates are under compression. When protrusions 55 slip into niches 57, the fastener is in its tightened condition and in a "secured" condition, that is, the fastener is safe against moving from its tightened condition due to vibrations.

To remove the fastener for reuse, the fastener is rotated by a suitable tool engaging slot 53 until the portions 49 of ledges 33 no longer engage cams 45 and cams 45 are loosely embraced or received by recessed portions 47, whereupon heads 25 move toward plate 35 and the compression within and between plates 35 and 36 is released. A suitable tool is then pushed down on the lower faces 61 of cutaway portions 59 of heads 25, thus forcing the fastener into its collapsed condition (Figure 1) so that the fastener may then be lifted out of the holes in plates 35 and 36 and be ready for reuse.

Referring particularly to Figures 8 to 16, inclusive, there is shown therein a second embodiment of the invention that is designated as a "spread" fastener. In this embodiment, each of the two complementary parts 21 and 23 consists of a tension head 25 with its flat vertical surface 26 and ledge 33 and a shank portion 27 with its flat surface 29 and toe 37 and toe surface 39. Surfaces 26 and 29 are not in the same plane, but the planes of the surfaces 26 and 29 intersect substantially in the plane of the pivot pin between the two parts.

The shanks 27 of the spread fastener are generally similar to the shanks of the slide fastener, except that shank flat surfaces 29 of the spread type are in contact with each other only when the fastener is in its collapsed condition and are spread apart from each other when the fastener is in its expanded condition, that is, when the fastener is in its engaging position relative to articles to be fastened together.

One construction and arrangement of pin and journals to pivot the two complementary parts 21 and 23 on each other, consists of forming in such parts generally semi-cylindrical protrusions 63 (Figure 9) and generally semi-cylindrical depressions 65 on the opposite sides of the longitudinal centerline of the heads 25 and shanks 29, that is, on opposite sides of the center planes of the parts 21 and 23 which are at right angles to the axis of pin 31 when the fastener is assembled. The surfaces of the protrusions and the depressions may be complementary to each other about the axis of the pin 31 and are of such dimensions as to permit of relative motion therebetween. Holes are bored in protrusions 63 to form journals 67. The diameters of the journals 67 in protrusions 63 are such that a rotating fit exists between the journals and the pin 31, when the pin 31 is inserted in these journals.

The axis of pin 31 is substantially in the planes of ledges 33 of the heads 25 and in the intersection of surfaces 26 and 29.

A shallow niche is cut out of each head 25 to form a shallow slot 69 (Figures 9 and 10) in the heads 25 when they are assembled and the fastener is in its expanded condition. It is apparent that when the fastener is not under tension, a force applied in this slot by the end of a flat tool, such as a screw driver, will force apart the heads 25 as they pivot on pin 31, thus forcing the fastener from an expanded condition to a collapsed condition.

Another form of pivot system for the spread type of fastener of this invention is shown in Figures 13, 14a and 14b. In this pivot system, holes 71 are drilled in each of the parts at right angles to the line of intersection of flat surfaces 26 and 29, which line is substantially in the planes of the ledges 33. Holes 71 are hollowed out to make enlargements 73, which may be oval in cross section. The pivot consists of two sections 75 and 77, one of the ends of which sections are circular to fit snugly in holes 71 and the other ends of which sections are flattened out as at 79 and provided with a hole 80 through which pin 31 fits. The flat ends of sections 75 and 77 and pin 31 fit loosely in enlargements 73.

Figure 16:
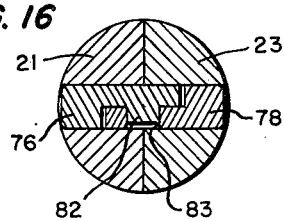
Figure 16 is a horizontal cross-section view of a spread type fastener taken in the plane of the axis of the pivot system shown in Figure 15.

Another form of pivot system for the spread type of the fastener of this invention is shown in Figures 15 and 16. In this pivot system holes 71 are drilled and enlargements 73 are made in the parts 21 and 23, as for the system disclosed in Figures 13, 14a and 14b. The pivot itself consists of two sections 76 and 78, one of the ends of which sections being circular as in cross section to fit snugly in holes 71 and the other ends of which sections are flattened out as at 81. On section 76 is formed a raised protuberance 82 and in section 78 is formed a depression or hole 83, the hole 83 being adapted to engage protuberance 82. There is thus formed a pivot between sections 76 and 78 when the flat surfaces 81 of the two sections are in sliding contact with each other.

To assemble the spread type of fasteners shown in Figure 9, the two parts 21 and 23 are positioned such that the axes of journals 67 are in alignment. The pin 31 is then inserted into the journals. The ends of pin 31 may be peened over after the assembly of the fastener to assure that the parts 21 and 23 will remain together as a unit during rough handling, shipment, use or reuse.

To assemble the spread type of fastener using the pivot system shown in Figures 13, 14a and 14b, the round end of section 75 is inserted in hole 71 of one counterpart, say 21, and the other section 77 and pin 31 are assembled to form the pivot system. The other counterpart 23 is then moved such that the round end of section 77 engages the hole 71 in part 23, as shown in Figure 14a.

The manner of assembling the spread type of fastener using the pivot system shown in Figures 15 and 16 is obviously similar to that disclosed in connection with the pivot system shown in Figures 13, 14a and 14b.

Referring particularly to Figures 17, 18, 19a and 19b, there are shown therein several constructions of fasteners to hold the two plates 35 and 36 in a water tight condition. A slide fastener, such as shown in Figure 5, is used to illustrate the details of a water tight arrangement, but it will be understood that either the slide type or the spread type of fastener may be used.

Figure 17:
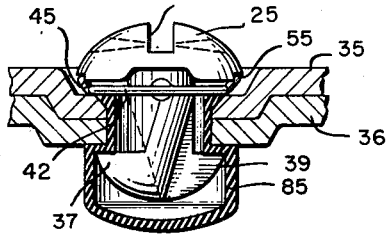
Figure 17 is a cross section elevation view of a slide fastener and a flexible sack for holding two plates together in water tight relation.

Figure 17 shows the arrangement of parts of a slide fastener (Figure 5) engaging plates 35 and 36, but with the resilient member in the form of a wire spring 42, with the cams 45 formed by bends in the wire, as shown in Figure 4c. A flexible sack 85 is inserted in the holes in plates 35 and 36 before the fastener is positioned in the holes such that the walls of the sack 85 may be spread out and engage the under or blind surface of plate 36 and the flat surface 39 of the toes 37. When a tension force is exerted within the fastener and against the blind surface of plate 36, the holes in plates 35 and 36 are closed in a water tight condition.

Figure 18:
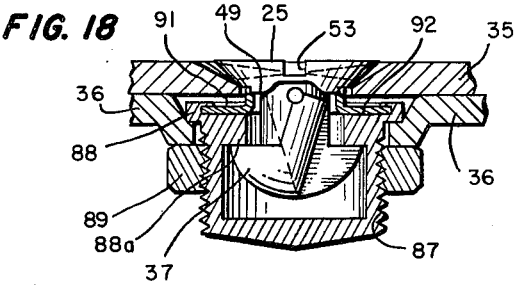
Figure 18 is a cross sectional view of a slide fastener and a closed ended cup and nut, for holding two plates together in water tight relation.

With reference to Figure 18, a threaded closed ended cup 87, with a lip 88 positioned in a detent in the upper surface of plate 36, is held in position on this plate by nut 89. In the upper surface of cup 87 is positioned a resilient member 91 of the shape shown in Figure 4b. This member 91 is compressed against the inner surface of cup 87 as at 92 and when the fastener and plates 35 and 36 are placed under compression by portions 49 engaging cams 55 on member 91, water tight integrity is established between the exposed surface of plate 35 and the blind surface of plate 36. The heads 25 are shown as flat so as to fit flush with the exposed surface of plate 35. The member 91 is held to cup 87 by having the upper edge of lip 88 spun over the member 91.

Figure 19A:
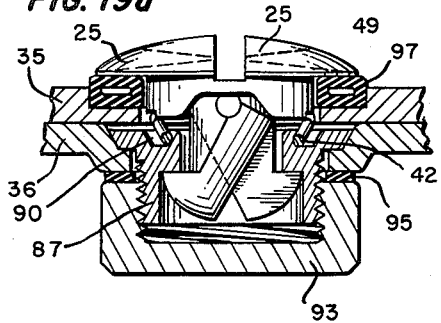
Figure 19a is a cross sectional view of slide fastener, an open ended cup, a closed ended nut and gaskets, for holding two plates together in water tight relation.
Figure 19B:
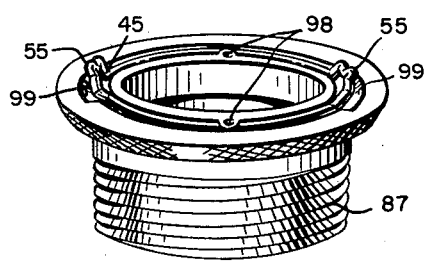
Figure 19b is a perspective view of the open ended cup shown in Figure 19 and showing in assembled position the resilient ring member disclosed in Figure 4c.

A modification of the arrangement of parts disclosed in Figure 18 is shown in Figures 19a and 19b in which the receptacle means or cup 87 is shown as an open ended cylinder and a separate cup 93 is screwed thereon. A gasket 95 is positioned between cup 93 and the under surface of plate 36 and a gasket 97 is positioned in a cutaway portion in the exposed surface of plate 35. The wire spring tension member 42 is seated in a groove 90 in the upper surface of cup 87 and is spot welded therein as at 98.

As an alternate way of keeping spring 42 from turning as the compression forces in the plates 35 and 36 are being increased by portions 49 in ledges 33 engaging the upturned sections or cams 45, the end of the wire spring may be turned downward as at 44 and this portion of the wire may be inserted in a hole to be drilled in the groove 90.

Depressions 99 are provided in the upper surface of cup 87 to allow for the down bending of upturned sections 45 of spring 42, as pressure is exerted thereon by portions 49 of ledges 33.

Figure 4D:
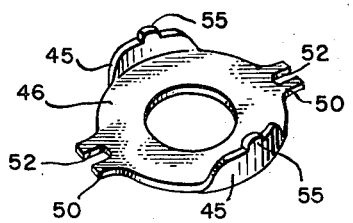

With reference to Figures 4d, 20a and 20b, there is disclosed therein a modification of the fastener of this invention in which the two pivoted parts 21 and 23 are loosely held together with the resilient member 46, by a second resilient member 48, such as a C-ring, that engages grooves 54 in the shanks of parts 21 and 23. By making the central hole in resilient member 46 less in diameter than the outside diameter of C-ring 48, when it is in the grooves 54, resilient member 46 and the pivoted parts of the fastener are held together as a unit for shipping storage, use and reuse purposes. By spacing the grooves 54 a distance from the pivot pin 31, the force of the ring 48 will tend to keep the assembled fastener in its collapsed condition, as shown in Figure 20a, ready for insertion in holes in articles to be fastened together. Ring 48 will also move the fastener to its collapsed condition and ready for extraction from the said holes upon the release of the tension in the parts of the fastener when the turning of the heads 25 relative to the resilient member 46 moves the recessed portions 47 to positions opposite the upturned sections 45 of resilient member 46.

In the fastener shown in Figures 4d, 20a and 20b, there is provided, in resilient member 46, lugs 50 that extend radially beyond the heads 25. In these lugs are slots 52 into which spanner wrench prongs may be inserted. Thus the resilient member 46 may be restrained from turning when the parts 21 and 23 are rotated about their vertical axes and tension is built up in the parts 21 and 23 as portions 49 ride up on sections 45. Other shapes of lugs 50 may be used, such as vertical ridges formed integrally or attached to resilient members 46 and adapted to receive the prongs of the spanner wrench.

It will be apparent, from an examination of Figures 1, 5, 8 and 10, that if it is desired that the fasteners of this invention hold a plurality of articles, such as plates 35 and 36, together under only a low tension, the ledge surfaces 33 may consist of single plane surfaces, that is, without recessed portions 47 and extended portions 49. Likewise, the resilient member 41 could be cup shaped or other forms of resilient material and positioned between the heads 25 and plate 35 or between surfaces 39 and plate 36 or between the plates 35 and 36 or between the parts 21 and 23. The two counterparts 21 and 23, in their collapsed condition, are inserted into the holes of the plates with the resilient member 41 between the heads 25 and the plate 35. By exerting pressure on the heads 25, the resilient member may be depressed sufficiently to permit the toes 37 to swing out into their engaging positions and the toe surfaces 39 contact the blind surface of the lower plate 36. Thus the fastener assumes its tightened condition. It will be realized, of course, that closer tolerances must be observed in the length of the shanks in their relation to the thickness of the articles to be fastened together and the "take-up" (difference between the distance from the ledge 33 to surface 39 and the thickness of the articles to be fastened together) clearance must be more accurately determined. The fasteners may be removed by moving them into their collapsed condition by applying forces to the grooves in the heads 25.

There is thus disclosed two embodiments and modifications of the fastener of my invention, each embodiment having the common feature of the combination of two counterparts pivoted one on the other with resilient means adopted to place in compression the articles to be fastened together and to place the fastener shanks under tension.

While the preferred embodiments of the invention have been illustrated and described by way of examples, it will be obvious that changes may be made therein within the spirit and scope of the invention and, therefore, the invention is not limited to the precise forms herein disclosed.

What I claim is:

1. In a slide type fastener for engaging two articles having alignable apertures therein, the combination comprising two complementary parts having longitudinally extending flat surfaces slidable on each other, each part including a semi-circumferential head including means for rotating said fastener, a tapered shank depending from said head, and a toe extending laterally from said shank and underlying said head, the toes of the respective fastener parts extending in opposite lateral directions, each of said heads having a semi-circumferential ledge on its underside, the complementary fastener parts being pivotally connected adjacent the heads; and a resilient washer carried on the shanks of said parts between the toes and the heads, said heads and washer having cooperating camming means operable as said fastener is rotated for forcing said toes laterally apart and bringing said ledges into substantially coplanar relationship with said articles resiliently clamped between said ledges and said toes.

2. In a fastener for engaging two articles having alignable apertures therein, the combination comprising two complementary parts having adjacent flat surfaces slidable on each other and each part including a head with a ledge on its underside formed with spaced cam surfaces and a depending shank having a toe extending laterally therefrom and oppositely from the toe of the other part; a pivot pin connecting the said parts substantially in the plane of said ledges whereby the said parts may be moved relative to each other into a collapsed condition for insertion through the apertures in said articles, and moved relative to each other into an expanded condition for engaging the exposed surfaces of said articles between the said heads and said toes, each of said heads being formed with an inclined ledge on its flat surface and above the pivot pin and having the ledges oppositely inclined whereby a bladed tool may be inserted in the slot formed by said ledges to force the parts from an expanded to a collapsed condition; and a resilient washer carried on the shanks of said parts between the toes and the heads and having spaced portions upturned and enengageable with the cam surfaces formed in said ledges to produce resilient clamping pressure.

3. The combination of claim 2 in which the heads are formed with aligned slots extending transversely of the ledges for camming rotation of the fastener.

References Cited in the file of this patent

UNITED STATES PATENTS

| 551,931 | Kennedy | Dec. 24, 1895 |
| 594,526 | Glauber | Nov. 30, 1897 |
| 641,054 | Tirrell | Jan. 9, 1900 |
| 891,574 | Swain | June 23, 1908 |
| 1,075,919 | Kling | Oct. 14, 1913 |
| 1,199,014 | Ludeke et al. | Sept. 19, 1916 |
| 1,406,423 | Smith | Feb. 14, 1922 |
| 1,585,309 | Monckmeier | May 18, 1926 |
| 2,062,057 | Hobby | Nov. 24, 1936 |
| 2,555,291 | Poupitch | May 29, 1951 |

FOREIGN PATENTS

| 2,937 | Great Britain | Feb. 5, 1912 |
| 175,707 | Great Britain | Mar. 2, 1922 |
| 488,179 | France | June 1, 1918 |
| 513,391 | Belgium | Aug. 30, 1952 |

OTHER REFERENCES

Ser. No. 431,625, Von Opel. (A. P. C.), published May 4, 1953.